United States Patent [19]

Washizuka et al.

[11] Patent Number: 4,651,294
[45] Date of Patent: Mar. 17, 1987

[54] ELECTRONIC FUNCTION CALCULATOR WITH IMPROVED FUNCTIONAL COMMAND ENTRY

[75] Inventors: Isamu Washizuka, Soraku; Koichi Oda, Sakai, both of Japan

[73] Assignee: Sharp Kabushiki Kaisha, Osaka, Japan

[21] Appl. No.: 610,645

[22] Filed: May 16, 1984

[30] Foreign Application Priority Data

May 27, 1983 [JP] Japan ................... 58-94678

[51] Int. Cl.$^4$ .............................................. G06F 7/38
[52] U.S. Cl. ...................................................... 364/709
[58] Field of Search ........................................ 364/709

[56] References Cited

U.S. PATENT DOCUMENTS 4,053,753 10/1977 Sado et al. ........................ 364/709
4,302,816 11/1981 Yamamoto ......................... 364/709
4,473,886 9/1984 Rizk et al. .......................... 364/709
4,495,592 1/1985 Caldwell et al. .................. 364/754
4,519,045 5/1985 Caldwell et al. .................. 364/709

Primary Examiner—David H. Malzahn
Attorney, Agent, or Firm—Birch, Stewart, Kolasch & Birch

[57] ABSTRACT

A portable electronic computer or calculator is characterized in that it calculates a functional operation on the previously calculated result by simply actuating a function key switch while the result is being displayed. It is unnecessary to actuate any entry key switch. In a specific form of the present invention, the computer may calculate a functional operation on numerical data in response to input of a function command, the numerical data being either newly inputted or previously calculated.

4 Claims, 3 Drawing Figures

ELECTRONIC FUNCTION CALCULATOR WITH IMPROVED FUNCTIONAL COMMAND ENTRY

BACKGROUND OF THE INVENTION

The present invention relates to a portable electronic computer and, more particularly, to a portable electronic function calculator for calculating function operations with a function keyboard.

In the conventional function calculator, just after a calculation has been completed, a functional operation on the result of the calculation cannot be calculated by simply actuating some functional keyboard. Further, conventionally, a functional operation such as "SIN 30" is started by key inputting "SIN", "3", "0", and "ENTER", thus needing to actuate the enter key. It is impossible to eliminate the actuation of the enter key.

SUMMARY OF THE INVENTION

Accordingly, it is an object of the present invention to provide an improved portable computer for calculating functional operations with simplified key inputs.

It is another object of the present invention to provide an improved portable electronic functional calculator for calculating a functional operation on the previously calculated result by actuating a functional keyboard during display of the result.

It is a further object of the present invention to provide an improved portable electronic functional calculator which starts functional operations by key inputting numeral data and actuating a functional key switch without actuating any entry key.

Briefly described, in accordance with the present invention, a portable electronic functional computer or calculator is characterized in that it calculates a function operation on the previously calculated result by actuating a function key switch during display of the result. It is unnecessary to actuate any entry key switch. In a specific form of the present invention, the computer may calculate functional operations on newly input or previously calculated numeral data by a function command.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
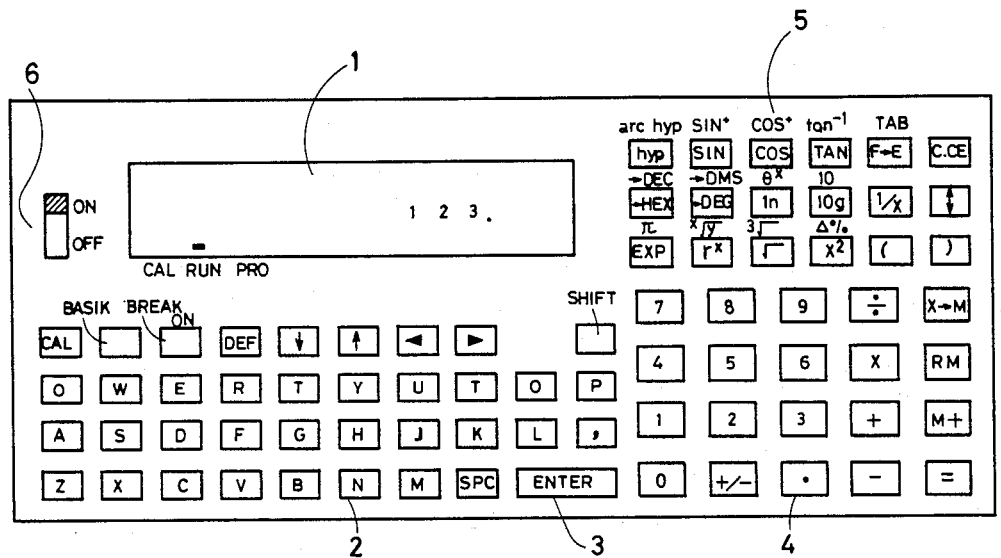
FIG. 1 shows a plan view of a portable electronic functional computer or calculator according to the present invention.

FIG. 1 shows a plan view of a portable electronic functional computer or calculator according to the present invention.

The computer of FIG. 1 comprises a display 1, a character keyboard 2, an input key switch "ENTER" 3, a numeral keyboard 4, a function keyboard 5, and a power switch 6.

The display 1 is operated to show inputted data and calculated results. The character keyboard 2 is operated to input character data. The input key switch "ENTER" 3 is operated for programming but need not be operated to perform functional operations. The numeral keyboard 4 is operated to input numeral data. The function keyboard 5 is operated to input a function command. The power switch 6 is operated to electrically power the computer of FIG. 1.

Figure 2:
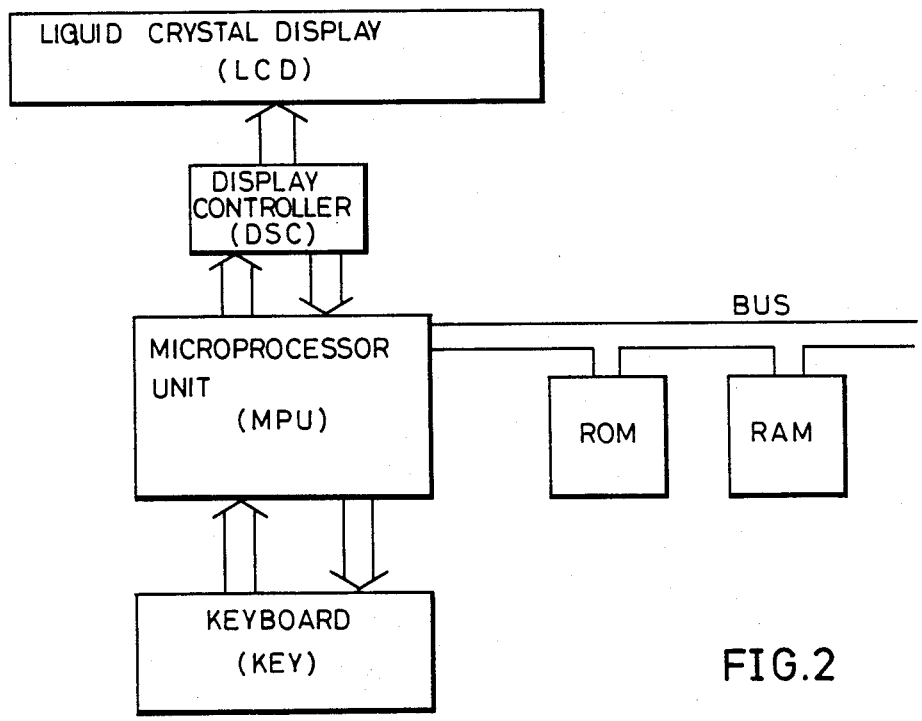
FIG. 2 shows a block diagram of a circuit implemented within the computer of FIG. 1.

FIG. 2 shows a block diagram of a circuit implemented within the computer of FIG. 1.

Referring to FIG. 2, the circuit comprises a display such as a liquid crystal display (LCD), a display controller (DSC), a microprocessor unit (MPU), a keyboard (KEY), a read only memory (ROM), and a read/write memory (RAM).

Responsive to control by the controller, the display illuminates characters or symbol segments. The keyboard is actuated to input data. The microprocessor unit comprises an input/output port for detecting key inputs. The read/write memory may be a Random Access Memory (RAM). The read/write memory provides various registers, flags, and stores certain programs. The read only nemory stores an interpreter for executing the program, subroutines for executing some functional operations, and other control programs. The microprocessor unit controls the operations of the keyboard, the display controller, the read only memory and the read/write memory, so as to operate the program and some functional operations. A bus is provided for coupling the microprocessor unit to both the read only memory and the read/write memory.

Figure 3:
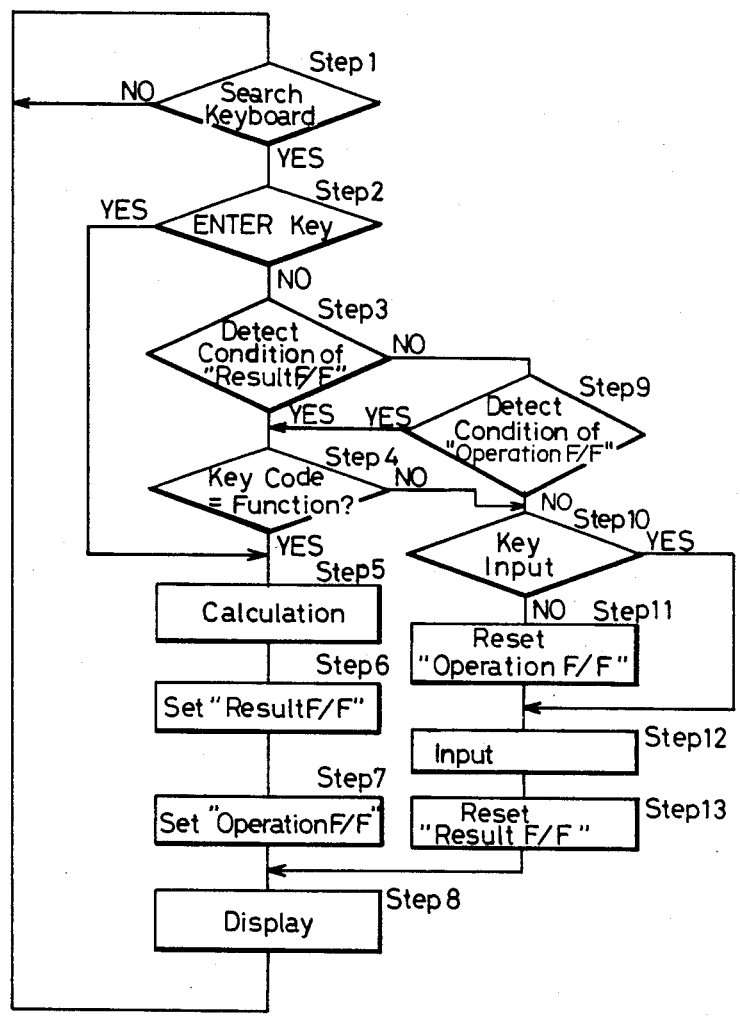
FIG. 3 shows a flow chart of the functional operation of the present invention.

FIG. 3 shows a flow chart of the functional operation according to the present invention.

Step 1: It is detected whether any key input is present. If a key input is present, a key code (8-bit data) corresponding to the inputted key is entered into a location of the RAM. If the key input is present, the following steps are conducted. Without any key input, step 1 is repeated.

Step 2: It is detected whether the key code stored in the location of the RAM corresponds to the key code of the "ENTER" key 3.

Step 3: It is detected whether the "Result flip-flop (F/F)" is set, when set, a calculation result is being displayed.

Step 4: It is detected whether the key code (8-bit data) corresponds to a function key.

Step 5: Necessary calculations or functional operations are carried out.

Step 6: The "Result F/F" is set.

Step 7: The "Operation flip-flop (F/F)" is set. The "Operation flip-flop (F/F)" is set from the start of calculation to the time when a key including the addition key "+" and the subtraction key "−" is inputted except when the numeral input keys "0" to "9" or, the decimal point key "." are input.

Step 8: The calculated result is displayed in the display. The display controller receives necessary numeral data and control data, then sends appropriate signals to the display to activate it.

Step 9: The condition of the "Operation F/F" is detected.

Step 10: It is detected whether the key code corresponds to one of the numeral input keys as stated in step 8.

Step 11: The "Operation F/F" is reset.

Step 12: Calculation formula key inputs are stored into a location of the RAM in the order of the key input operations.

Step 13: The "Result F/F" is reset.

Assuming that the following key input operations are carried out, although not limited to these operations after various calculations have been completed, so that the "Result F/F" and the "Operation F/F" are both set, operation according to the flow chart of FIG. 3 will be further explained.

(A) "SIN":

In response to the this key input, steps 1-2-3-4-5-6-7-8 are selected and carried out. In step 5, a SIN calculation of the numeral value now displayed in the display is calculated and, in step 8, the result of the functional operation is displayed.

(B) "3", "0", and "SIN":

In response to the input of "3", steps 1-2-3-4-10-12-13-8 are carried out. In response to the input of "0", step 1-2-3-9-4-10-12-13-8 are carried out. Finally, in response to the input of "SIN", steps 1-2-3-9-4-5-6-7-8 are carried out. In step 5, "SIN 30" is calculated and, in step 8, the result is displayed.

(C) "2", "+", "SIN", "5", and "ENTER":

In response to the inputs of the respective items, the following operations are carried out:

"2": steps 1-2-3-4-10-12-13-8
"+": steps 1-2-3-9-4-10-11-12-13-8
"SIN": 1-2-3-9-10-11-12-13-8
"5": steps 1-2-3-9-10-12-13-8
"ENTER": steps 1-2-5-6-7-8

Thus, the conventional calculations can be performed as well by the calculator of the present invention.

While only certain embodiments of the present invention have been described, it will be apparent to those skilled in the art that various changes and modifications may be made therein without departing from the spirit and scope of the present invention as claimed.

What is claimed is:

1. An electronic function calculating apparatus comprising:

keyboard means for inputting key information to said calculating apparatus, said keyboard means including data input means for inputting numerical data, and function keyboard means for inputting functional commands;

calculation means responsive to said keyboard means for detecting the input of key information from said keyboard means and calculating a result, said result being calculated in accordance with said functional commands and either said numerical data or a previously calculated result, said calculation means including detection means for detecting the completion of calculation of said result;

said calculation means, upon detection of the completion of calculation of said result and the input of a particular functional command by said function keyboard, calculating a new said result, in accordance with said result and said particular function command, said calculation of the new said result being performed automatically upon the input of said particular functional command.

2. The calculating apparatus of claim 1, wherein said calculation means calculates said result automatically upon the input of said numerical data and said functional commands.

3. The calculating apparatus of claim 2, wherein said calculation means, responsive to the input of said numerical data and said particular functional command and the detection of the completion of calculation of said result, automatically calculates a new said result in accordance with said numerical data and said particular functional command.

4. The calculating means of claim 1, further comprising a display means for displaying said results; and wherein said calculation means further includes:

a first flip-flop which is set by said calculation means when said result calculated by said calculation means is being displayed, and a second flip-flop which is set by said calculation means at the start of the calculation of said result and reset when a key on said keyboard means is actuated except when said key is a numeral digit key from "0" to "9" or a decimal point key ".".

* * * * *